Aug. 12, 1930.　　　　O. H. HANSEN　　　　1,772,543

TRANSPORTING MECHANISM

Filed May 24, 1924

INVENTOR—
O. H. Hansen
BY
W. H. Lieber
ATTORNEY.

Patented Aug. 12, 1930

1,772,543

UNITED STATES PATENT OFFICE

OSWALD H. HANSEN, OF PORT WASHINGTON, WISCONSIN, ASSIGNOR, BY MESNE ASSIGNMENTS, TO ANDERSON-BARNGROVER MFG. CO., OF SAN JOSE, CALIFORNIA, A CORPORATION OF CALIFORNIA

TRANSPORTING MECHANISM

Application filed May 24, 1924. Serial No. 715,716.

This invention relates in general to improvements in the art of transferring objects in succession from one locality to another along a definite path, and relates more specifically to improvements in the construction and operation of disk conveyors for transporting similar objects such as cans, in series along a definite course in a predetermined period of time.

An object of the invention is to provide improved transporting mechanism which is simple in construction and efficient in operation.

It has heretofore been common practice, especially in the canning industry, to utilize a plurality of similar horizontal disks having intermeshing peripheral teeth, the disks being rotatable about vertical axes and cooperating with stationary guides, to transport cans in succession along a definite path. Due to its simplicity and high efficiency, this disk type of transporting mechanism is relatively popular and is frequently used in so called "exhaust boxes" wherein the conveyor is disposed within a casing and the food laden cans are subjected to processing treatment during transportation thereof through the casing by the disks. In order to economize on space and to avoid undesirable enlargement of these exhaust boxes, the conveying surfaces of the can carrier disks should be utilized to the greatest possible extent for transporting purposes. While it has heretofore been proposed to utilize various arrangements and assemblages of the disks, all of the prior disk conveyors are objectionable in that considerable available can transporting surface is permitted to run idle, thus making these prior devices undesirably large and relatively inefficient.

The present invention contemplates the provision of a disk conveyor which is relatively compact in structure and wherein the can transporting surfaces are utilized to the fullest possible extent. The improvement also contemplates provision of more efficient driving and controlling means for the carrier disks, as well as simplified and more efficient guiding structure for confining the cans to the desired path of travel. Another object of the invention is to provide for more rapid and convenient assemblage and dismantling of disk conveyors and for ready removal of the disks and guides and access to all parts of the mechanism for purposes of cleaning. A further object of the improvement is to provide transporting mechanism in which the objects are gently transferred from one disk to another without injury, and in which jamming of cans is effectively avoided. These and other objects and advantages of the present improvement will be apparent from the following description.

A clear conception of several embodiments of the invention and of the operation of devices constructed in accordance therewith, may be had by referring to the drawing accompanying and forming a part of this specification in which like reference characters designate the same or similar parts in the various views.

While the invention is described herein as being specifically applied to exhaust boxes, it will be obvious that the novel features are capable of more general application. It will also be obvious that the device is adapted to transport objects other than cans and that other specific terms are employed merely for clearness of description and with no intention of thereby limiting the scope of the invention.

Figure 1:
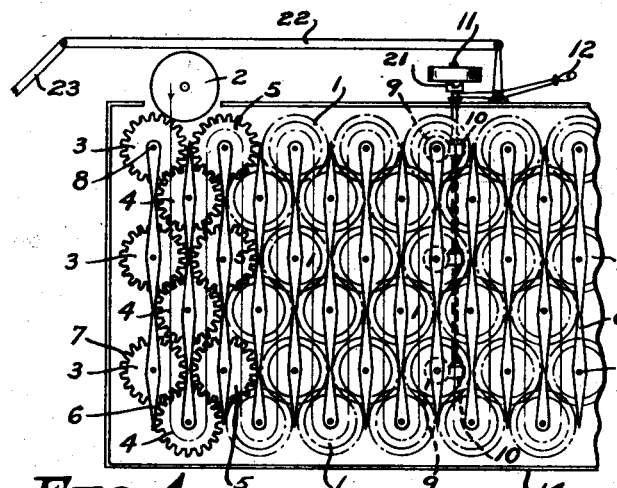
Fig. 1 is a somewhat diagrammatic plan view of a fragment of an exhaust box having a disk conveyor therein.
Figure 2:
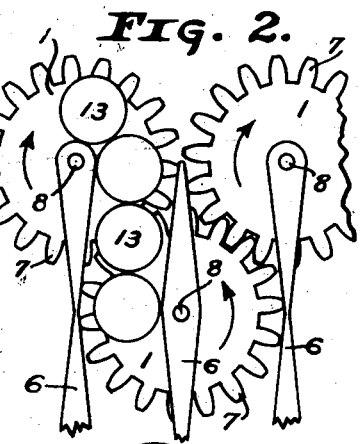
Fig. 2 is an enlarged fragmentary top view of an improved disk conveyor.
Figure 4:
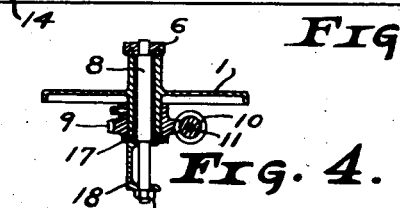
Fig. 4 is a central vertical section through one of the carrier disks and the driving mechanism thereof.

Referring specifically to the embodiment of the invention shown in Figs. 1, 2 and 4, the exhaust box comprises in general a casing 14 having therein a disk conveyor consisting of a plurality of horizontal carrier disks 1 rotatable about vertical axes and a series of substantially rectilineal can guides 6 disposed above the disks 1 and extending transversely of the casing 14. Each of the carrier disks 1 has relatively large peripheral teeth 7 and a central vertical bored bulb rotatably cooperable with a stationary vertical journal column 8. The journal columns 8 are detachably secured to channel bars 18 by means of clamping nuts 24, the channel bars 18 extending transversely across the casing 14 and being attached to the casing side walls in any suitable manner. The central hubs of the disks 1 rest upon thrust collars 17 embracing the columns 8 and coacting with the upper surfaces of the channel bars 18. The upper reduced ends of the columns 8 provide supports for the can guides 6, the guides being freely vertically removable from these supports and the disks 1 likewise being freely vertically removable from the columns 8 after the guides 6 have been removed. The disks 1 are divided into three independently driven groups extending longitudinally of the exhaust box, each group of disks being driven by a worm 10 secured to the power shaft 11 and cooperating with a worm wheel 9 secured to the lower hub portion of a medial disk 1 of the group. The remaining disks 1 of each group are driven from the driver by virtue of the intermesh between the peripheral teeth 7 of the disks 1 of that group, but the teeth 7 of the disks of adjacent groups do not mesh with each other. The power shaft 11 is capable of being rotated by means of a pulley which is drivingly connectible with the shaft by means of a clutch 21 controllable by means of a lever 12. The lever 12 besides controlling the clutch 21, simultaneously controls the supply of cans 13 delivered to the rotary supply disk 2 from the capper or other source of supply, through the connections 22, 23.

Figure 3:
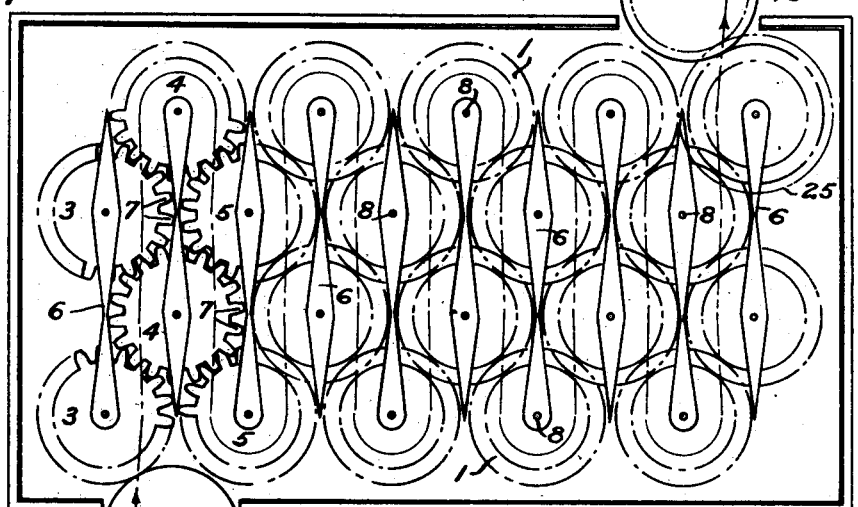
Fig. 3 is a diagrammatic plan view of another exhaust box having a modified form of disk conveyor therein.
Figure 5:
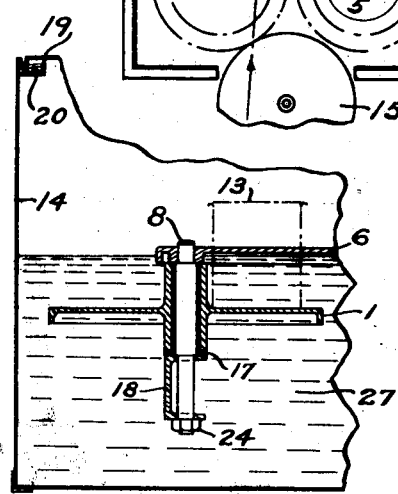
Fig. 5 is a central vertical section through a fragment of an exhaust box and through one of the carrier disks and the can guide associated therewith.

Referring specifically to the embodiment of the invention shown in Figs. 2, 3 and 5, the exhaust box comprises in general a casing 14 having therein a disk conveyor submerged in water 27 and consisting of a plurality of horizontal carrier disks 1 rotatable about vertical axes and a series of substantially rectilineal can guides 6 disposed above the disks and extending transversely of the casing 14. The disks 1 of this conveyor are the same as those of the conveyor of Figs. 1 and 4, and the supporting structure for the guides 6 and disks 1 is also similar. Due to the relatively small size of the exhaust box of Figs. 3 and 5, all of the disks 1 may, however, be driven by means of a single set of worm gearing comprising a worm 10 and worm wheel 9 applied to a selected disk 1 in an obvious manner. The successive cans 13 are delivered to the casing 14 by means of a rotary supply disk 15 and are discharged from the exhaust box by means of a delivery disk 16 which is rotatable at a higher speed than the supply disk 15 by means of gearing 25, 26. The modified exhaust box is also provided with a cover 19 coacting with a liquid seal 20 associated with the wall of the casing 14.

With reference to the direction of travel of the successive cans over the carrier disks, the disks 1 of the improved conveyor are arranged in rows 3, 4, 5 extending longitudinally of the guides 6 and cooperable to transport the cans in substantially rectilineal opposite directions. For convenience of description, reference will be made to the three rows of disks 1 nearest to the inlet of the exhaust box, although the same description is applicable to any three adjoining rows of disks. The disks of the side rows 3, 5 are all rotatable in the same direction and have peripheral teeth 7 which intermesh directly with the peripheral teeth 7 of the disks of the intermediate row 4, the latter being rotatable in the opposite direction. The teeth 7 of disks of the side rows 3, 5 do not intermesh directly, but these disks are located laterally adjacent to each other and between the successive disks of the intermediate row 4. The guides 6 of the three rows 3, 4, 5 are arranged parallel to each other, the medial guide 6 being disposed centrally over the intermediate row 4 and tangentially relatively to the disks of the side rows 3, 5.

During normal operation of the transporting mechanism, the cans 13 are delivered in succession by the rotating supply disk 2, 15 to the receiving carrier disk 1 of the side row 3. The rotating carrier disks 1 then cooperate with the stationary rectilineal guides 6 to automatically and constantly transport the successive cans 13 in substantially rectilineal opposite directions, first along the transporting surfaces of the cooperating disks 1 of the side row 3 and of the intermediate row 4, and then along the transporting surfaces of the cooperating disks 1 of the opposite side row 5 and of the intermediate row 4. During transportation of the cans 13, the guides 6 permit slight travel of the cans laterally of their general rectilineal path of travel thus gently agitating the confined product. As the cans reach the end of their travel in one direction, the end disks 1 automatically reverse the direction of transportation in an obvious manner, thus causing the successive cans 13 to advance in a series of substantially recilineal transverse opposite courses through the entire casing 14 whereupon the treated cans are delivered by means of the rotating discharge disk 16. From Fig. 2, it will be apparent that with an exhaust box properly filled with cans 13, the transferring surfaces of the disks 1 are utilized to their fullest possible extent, practically the only surface not available being that below the guides 6 and along the unemployed sides of the end rows 3. The device is obviously capable of transporting cans 13 of various diameters, but the smaller the cans, the greater the waste of transferring surface becomes. The improvement however permits utilization of both sides of the transporting surfaces of all of the inner disks 1, by virtue of the rectilineal travel of the cans 13 thereover.

By providing peripheral teeth 7 of relatively large size, the transfer of cans 13 from one disk 1 to an adjoining disk is effected more gently than if smaller teeth are used, and the cans are not so apt to be damaged by unevenness due to non-alinement of the transporting surfaces of the adjoining disks. The larger teeth also facilitate accurate construction of the disks 1 and are more readily cleaned. If a large number of disks 1 are utilized, it is preferable to provide a plurality of independent drives for selective groups of the disks as shown in Fig. 1, in order to insure uniform rotation of all of the disks and prevent the cans 13 from jamming due to lost motion between the cooperating disk teeth 7. Jamming of the cans 13 is also prevented by causing the discharge disk 16 to rotate at a higher rate of speed than the disks 1, so that free delivery of the treated cans is insured. With the provision of a common control lever 12 for simultaneously controlling the supply of cans 13 and the operation of the transporting mechanism, the supply of cans is automatically stopped in case it becomes necessary to stop the conveyor. It will thus be noted that the present improvement provides various precautions for preventing injury of the objects being transported and for insuring gentle and uniform transportation of the successive cans through the treating zone.

The entire mechanism is moreover readily accessible for inspection and cleaning. By removing the cover 19, the operation is observable without obstruction. The guides 6 which are supported solely by the columns 8, are freely vertically removable from their supports. After the guides 6 have been removed, the disks 1 are likewise freely vertically removable independently of each other. The columns 8 may be removed from the channels 18 upon release of the nuts 24 and the channels may be detachably associated with the walls of the casing 14, thus permitting convenient removal of all elements of the structure.

It should be understood that it is not desired to limit the invention to the exact details of construction and operation herein shown and described for various modifications within the scope of the claims may occur to persons skilled in the art.

It is claimed and desired to secure by Letters Patent:—

1. A transporting device comprising, adjacent rows of carrier disks of like diameter rotatable about vertical axes to urge objects therealong between the loci of the disk axes, the loci of the disk axes of said rows being parallel lines spaced apart less than a disk diameter, means for rotating the disks of the respective rows in opposite directions, and means for confining an object to movement between said loci.

2. A transporting device comprising, adjacent rows of carrier disks rotatable about axes to urge objects therealong, the axes of the disks of each row lying in a plane and said planes being spaced apart a distance less than a disk diameter, and means for confining an object to movement by said disks between said planes.

3. A transporting device comprising, two adjacent rows of horizontal carrier disks having vertical axes, the axes of the disks of each row lying in a plane and said planes being spaced apart a distance less than a disk diameter, and means for confining an object to movement by said disks between said planes.

4. A transporting device comprising, two adjacent rows of horizontal carrier disks rotatable about vertical axes, the axes of the disks of each row lying in a common plane and said planes being spaced apart a distance less than a disk diameter, and means for guiding an object alternately over the disks of said rows while confining said object to movement between said planes.

5. A transporting device comprising, two side rows and an intermediate row of carrier disks movable to convey an object longitudinally of said rows, and means for guiding said object in one direction along one of said side rows and said intermediate row of disks, and in the opposite direction along the other of said side rows and said intermediate row of disks.

6. A transporting device comprising, two adjacent rows of carrier disks rotatable about parallel axes to urge objects therealong between the loci of the disk axes, the loci of the disk axes of said rows being spaced apart less than a disk diameter and the axes of the disks of one row being staggered with respect to the axes of the disks of the other row, and means for confining objects to movement between said loci.

7. A transporting device comprising, two adjacent rows of carrier disks of like diameter rotatable about vertical axes to urge objects therealong between the loci of the disk axes, the loci of the disk axes of said rows being spaced apart less than a disk diameter and the axes of the disks of one row being staggered with respect to the axes of the disks of the other row, means for rotating the disks of the respective rows in opposite directions, and means for confining objects to movement by said disks between said loci.

8. A transporting device comprising, two side rows and an intermediate row of carrier disks, and a guide disposed tangentially of said side rows and centrally of said intermediate row of disks.

9. A transporting device comprising, two side rows and an intermediate row of carrier disks, the disks of said side rows being rotatable in the same direction and the disks of said intermediate row being rotatable in the opposite direction, and a substantially rectilineal guide disposed tangential to the disks of said side rows and centrally along the disks of said intermediate row.

10. A transporting device comprising, two side rows and an intermediate row of carrier disks, the disks of said side rows being located between the successive disks of said intermediate row and all of said disks being simultaneously rotatable to convey an object longitudinally of said rows, and a substantially rectilineal guide disposed tangential to the disks of said side rows and centrally relative to the disks of said intermediate row.

11. A transporting device comprising, two side rows and an intermediate row of carrier disks cooperable to convey objects longitudinally of said rows, means for rotating the disks of said side rows in the same direction and those of said intermediate row in the opposite direction, and means for guiding said objects in one direction along one of said side rows and said intermediate row, and in the opposite direction along the other of said side rows and said intermediate row.

12. A transporting device comprising, two side rows and an intermediate row of carrier disks simultaneously rotatable to convey objects longitudinally of said rows, and substantially rectilineal guides extending longitudinally of said rows for guiding said objects in one direction along one of said side rows and said intermediate row, and in the opposite direction along the other of said side rows and said intermediate row.

13. A transporting device comprising, two side rows and an intermediate row of carrier disks simultaneously rotatable about parallel vertical axes to convey objects longitudinally of said rows, and means for guiding said objects for successive advancement in one direction along one of said side rows and said intermediate row, and in the opposite direction along the other of said side rows and said intermediate row.

14. A transporting device comprising, two parallel side rows and an intermediate row of carrier disks rotatable at the same speed about parallel vertical axes to convey objects longitudinally of said rows, said disks having upper transporting surfaces lying in a common horizontal plane, and parallel substantially rectilineal guides for guiding said objects in one direction along one of said side rows and one side of the disks of said intermediate row, and in the opposite direction along the other of said side rows and the opposite side of the disks of said intermediate row.

In testimony whereof, the signature of the inventor is affixed hereto.

OSWALD H. HANSEN.